Figure 1:
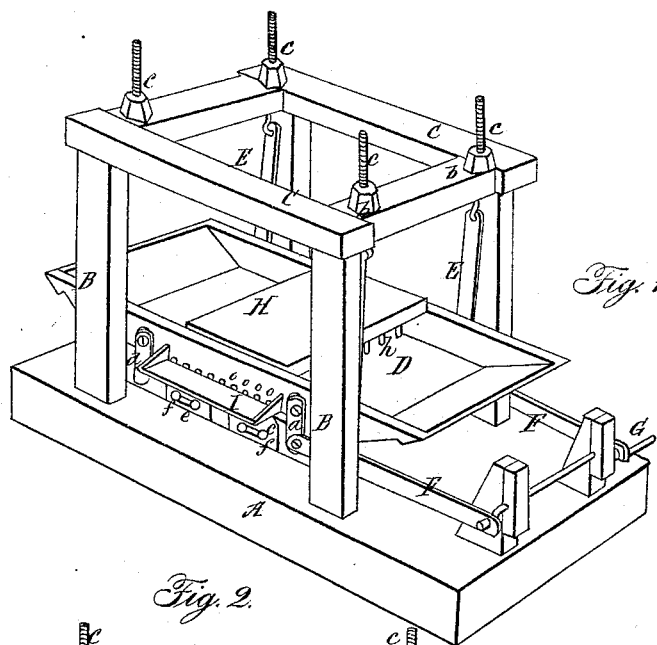
Figure 2:
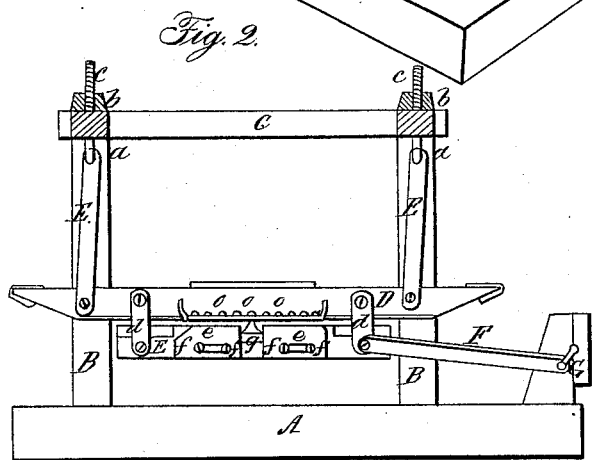
Figure 3:
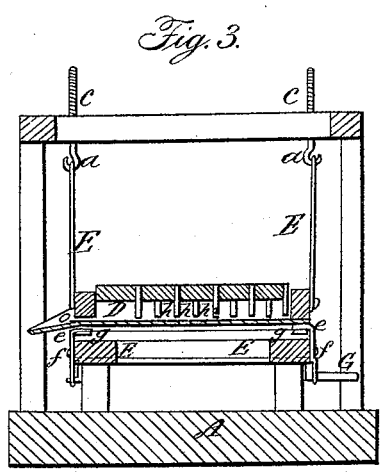
Figure 4:
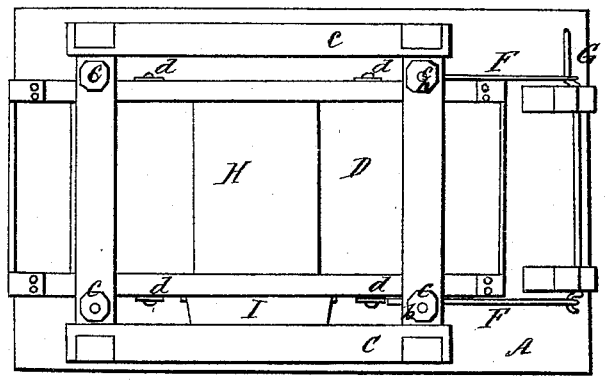

S. F. AMBLER.
Ore Amalgamator.

No. 34,286.  Patented Feb. 4, 1862.

Witnesses:

Inventor:

UNITED STATES PATENT OFFICE.

STEPHEN F. AMBLER, OF BROOKLYN, NEW YORK.

IMPROVED AMALGAMATOR.

Specification forming part of Letters Patent No. 34,286, dated February 4, 1862.

*To all whom it may concern:*

Be it known that I, STEPHEN F. AMBLER, of Brooklyn, Kings county, and State of New York, have invented, made, and applied to use a new and Improved Amalgamator for Gold and Silver; and I do declare the following to be a full, clear, and correct description of the same, reference being had to the accompanying drawings, making a part of this specification, and to the letters of reference marked thereon, in which—

Figure I is a front perspective view of my improved amalgamator; Fig. II, a side elevation of the same, two of the posts B being removed; Fig. III, an end view of the same; Fig. IV, a top view of the same.

In the drawings like parts of the invention are indicated by the same letters of reference.

The nature of my invention consists in the construction and operation of an improved amalgamator, as hereinafter described.

To enable those skilled in the art to make and use my invention, I will speak of the construction and operation of the same.

A shows a platform supporting the posts B, which posts B serve to support the crosspieces C.

D shows a pan suspended from the crosspieces C by means of the rods E, hung upon the hooks $a$, which hooks may be raised or lowered by the operation of the nut $b$ and screw $c$, thus rendering the pan D adjustable. The pan D may be made of iron or copper, although I prefer using the latter, in consequence of the readiness with which the mercury coats the same.

$E^2$ is a frame suspended from the pan D by means of the side plates $d$. This frame $E^2$ has attached on either side the slotted plates $e$, which are adjustable and held in place by the screws $f$, and serve, in combination with the bolt $g$, to give a vibratory motion to the pan D.

F shows a connecting-rod for connecting the frame E with the crank G, by the movement of which crank G a shaking motion is given to the pan D.

H shows an agitating-board attached at or near the center of the pan D and moving with the same, and which agitating-board H is provided on its under side with any number of iron or copper fingers $h$.

$o$ shows a series of discharge-holes placed upon the side of the pan D near its bottom, and I is a trough, by which means the sand and water are discharged from the pan D.

The apparatus may be driven by any convenient motor.

Mercury is put into the iron or copper pan D in a sufficient quantity, and when a copper pan is employed immediately coats the same. Motion is then imparted to the pan D by means of the crank G and frame $E^2$, and the ore to be amalgamated is fed into the pan D from a hopper or in any convenient manner on the side opposite to the discharge-openings. The motion of the pan D and the current of water carry the sand separated from the gold or silver to the discharge-openings $o$ and trough I. In order that the sand may be prevented from "caking" and carrying off with it the finer particles of gold, as well as the fine globules of mercury, I employ the agitating-board H provided with the copper or iron pins or fingers and moving in harmony with the pan D. It will be observed that the pan D has a double motion—vibratory and shaking—by the employment of which motions a less violent action is given to the pan D. It will also be observed that the sand and water are discharged from the side of the pan where the least agitation occurs, instead of at the end of the pan, as formerly, which operation has a tendency to retain the finer particles of gold within the pan D.

Having thus described my invention, what I claim as new, and desire to secure by Letters Patent, is—

1. Giving to the pan D the shaking and vibratory motions, for the purpose described.

2. The combination of the agitating-board H, constructed as shown, with the pan D, for the purpose specified.

3. Placing the discharge-openings $o$ upon the side of the pan D, for the purpose set forth.

STEPHEN F. AMBLER.

In presence of—
J. WINCHESTER,
A. SIDNEY DOANE.